US011354513B2

(12) United States Patent
Modani et al.

(10) Patent No.: US 11,354,513 B2
(45) Date of Patent: Jun. 7, 2022

(54) AUTOMATED IDENTIFICATION OF CONCEPT LABELS FOR A TEXT FRAGMENT

(71) Applicant: Adobe Inc., San Jose, CA (US)

(72) Inventors: Natwar Modani, Karnataka (IN); Srinivas Saurab Sirpurkar, Andhra Pradesh (IN); Paridhi Maheshwari, Karnataka (IN); Harsh Deshpande, Maharashtra (IN); Diviya Singh, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 206 days.

(21) Appl. No.: 16/784,000

(22) Filed: Feb. 6, 2020

(65) Prior Publication Data

US 2021/0248322 A1 Aug. 12, 2021

(51) Int. Cl.
*G06F 40/279* (2020.01)
*G06F 40/131* (2020.01)
*G06F 40/30* (2020.01)
*G06F 9/30* (2018.01)
(Continued)

(52) U.S. Cl.
CPC .......... *G06F 40/30* (2020.01); *G06F 9/30036* (2013.01); *G06F 40/216* (2020.01); *G06V 30/416* (2022.01)

(58) Field of Classification Search
CPC ...... G06F 16/313; G06F 40/131; G06F 40/20; G06F 40/237; G06F 40/242; G06F 40/279; G06F 40/284; G06F 40/30
USPC .......... 704/1, 9, 10; 707/736, 739, 741, 749, 707/750, 752, 754
See application file for complete search history.

(56) References Cited

U.S. PATENT DOCUMENTS

2003/0177000 A1* 9/2003 Mao .................. G06F 40/30
704/9
2003/0217335 A1 11/2003 Chung et al.
2007/0005592 A1 1/2007 Kender et al.
(Continued)

OTHER PUBLICATIONS

Gabrilovich, Evgeniy, et al., "Computing Semantic Relatedness using Wikipedia-based Explicit Semantic Analysis" IJCAI: Proceedings of the 20th International Joint Conference on Artificial Intelligence, Jan. 2007 6 pages.
(Continued)

*Primary Examiner* — Martin Lerner
(74) *Attorney, Agent, or Firm* — Kilpatrick Townsend & Stockton LLP

(57) ABSTRACT

A technique for intelligently identifying concept labels for a text fragment where the identified concept labels are representative of and semantically relevant to the information contained by the text fragment is provided. The technique includes determining, using a knowledge base storing information for a reference set of concept labels, a first subset of concept labels that are relevant to the information contained by the text fragment. The technique includes ordering the first subset of concept labels according to their relevance scores and performing dependency analysis on the ordered list of concept labels. Based on the dependency analysis, the technique includes identifying concept labels for a text fragment that are more independent (e.g., more distinct and non-overlapping) of each other, representative of and semantically relevant to the information represented by the text fragment.

20 Claims, 6 Drawing Sheets

(51) Int. Cl.
   *G06F 40/216* (2020.01)
   *G06V 30/416* (2022.01)

(56) References Cited

U.S. PATENT DOCUMENTS

| | | | |
|---|---|---|---|
| 2007/0233656 A1 | 10/2007 | Bunescu et al. | |
| 2010/0185943 A1* | 7/2010 | Wang | G06F 40/258 715/254 |
| 2014/0282244 A1* | 9/2014 | Speer | G06F 40/103 715/811 |
| 2015/0095013 A1 | 4/2015 | Zillner et al. | |
| 2015/0278200 A1* | 10/2015 | He | G06F 40/30 704/2 |
| 2015/0293905 A1* | 10/2015 | Wang | G06F 40/30 704/9 |
| 2016/0012122 A1* | 1/2016 | Franceschini | G06F 40/134 707/739 |
| 2016/0012336 A1 | 1/2016 | Franceschini et al. | |
| 2016/0162569 A1 | 6/2016 | Erle et al. | |
| 2017/0004202 A1* | 1/2017 | Patterson | G06F 40/197 |
| 2017/0286835 A1* | 10/2017 | Ho | G06F 40/30 |
| 2018/0101773 A1* | 4/2018 | Yu | G06F 40/00 |
| 2018/0373791 A1* | 12/2018 | Yen | G06F 40/30 |
| 2019/0026371 A1* | 1/2019 | Wenzek | G06F 40/30 |
| 2020/0027545 A1* | 1/2020 | Xie | G06N 3/0454 |
| 2020/0097602 A1 | 3/2020 | Ristoski et al. | |
| 2020/0257761 A1 | 8/2020 | Bull et al. | |
| 2020/0286002 A1 | 9/2020 | Szanto et al. | |
| 2021/0034822 A1* | 2/2021 | Bessho | G06F 40/30 |
| 2021/0056168 A1* | 2/2021 | Bull | G06F 40/30 |
| 2021/0073307 A1* | 3/2021 | Lu | G06F 40/53 |
| 2021/0157831 A1* | 5/2021 | Doring | G06F 40/30 |
| 2021/0248322 A1 | 8/2021 | Modani et al. | |
| 2021/0248323 A1* | 8/2021 | Maheshwari | G06F 40/30 |

OTHER PUBLICATIONS

Auer Soren, et al., "DBpedia: A Nucleus for a Web of Open Data", In: Aberer K. et al. (eds) The Semantic Web. ISWC 2007, ASWC 2007. Lecture Notes in Computer Science, vol. 4825. Springer, Berlin, Heidelberg, 2007 14 pages.

Mikolov, Tomas, et al., "Distributed Representations of Words and Phrases and Their Compositionality", NIPS' 13: Proceedings of the 26th International Conference on Neural Information Processing Systems—vol. 2, Dec. 2013, 9 pages.

Pennington Jeffrey, et al., "GlovVe: Global Vectors for Word Representation", https://www.google.com/url?sa=t&rct=j&q=&esrc=s&source=web&cd=&cad=rja&uact=8&ved=2ahUKEwjbtbqipt7pAhXsYt8KHdzxCEcQFjABegQIBRAB&url=https%3A%2F%2Fwww-nlp.stanford.edu%2Fpubs%2Fglove.pdf&usg=AOvVaw1K-pZZ9EuJXzLDddvrbekL, 2014, 12 pages.

Blei, David M., et al., "Latent Dirichlet Allocation", Journal of Machine Learning Research 3, 2003, 30 pages.

Gabrilovich, Evgeniy, et al., "Wikipedia-Based Semantic Interpretation for Natural Language Processing", Journal of Artificial Intelligence Research 34, 2009, 56 pages.

U.S. Appl. No. 16/784,145, Non-Final Office Action, dated Nov. 15, 2021, 19 pages.

U.S. Appl. No. 16/784,145, Notice of Allowance, dated Mar. 16, 2022, 10 pages.

Jiao et al., "An Entropy-Based Term Weighting Scheme and Its Application In E-Commerce Search Engines", 1st International Symposium on Web Algorithms, Jun. 2015, 7 pages.

Wong et al., "An Information-Theoretic Measure of Term Specificity", Journal of the Association for Information Science and Technology (JASIST), vol. 43, Issue 1, Jan. 1992, (pp. 54-61) Abstract pp. 1-2.

* cited by examiner

| Words | Concept Label CL1 | Concept Label CL2 | Concept Label CL3 | . . . | Text Fragment (TF) for T1 |
|---|---|---|---|---|---|
| W1 | 0.06 | 0.0 | 0.03 | | 0.02 |
| W2 | 0.05 | 0.03 | 0.0 | | 0.05 |
| W3 | 0.04 | 0.07 | 0.06 | | 0.04 |
| W4 | 0.0 | 0.05 | 0.07 | | 0.06 |
| W5 | 0.1 | 0.2 | 0.09 | | 0.07 |
| . . . | | | | | |
| Wn | 0.09 | 0.06 | 0.04 | | 0.09 |

400

402A-402N

Dimensions for each concept vector, C1, C2 and C3 are {W1, W2, W3,.....Wn}

Concept Vector for C1 = {0.06, 0.05, 0.04, 0.0, 0.1,....0.09}

Concept Vector for C2 = {0.00, 0.03, 0.07, 0.05, 0.2....0.06}

Concept Vector for C3 = {0.03, 0.0, 0.06, 0.07, 0.09,.....0.04}

404

Dimensions for Text Fragment vector are {W1, W2, W3, .....Wn}

TF Vector for T1 = {0.02, 0.05, 0.04, 0.06, 0.07,....0.09}

FIG. 4

AUTOMATED IDENTIFICATION OF CONCEPT LABELS FOR A TEXT FRAGMENT

CROSS-REFERENCE TO RELATED APPLICATIONS

The present application is related to U.S. patent application Ser. No. 16/784,145, entitled "Automated Identification of Concept Labels for a Set of Documents" and filed concurrently with the present application. The entire contents of U.S. patent application Ser. No. 16/784,145 are incorporated herein by reference for all purposes.

TECHNICAL FIELD

This disclosure relates generally to processing textual information. More specifically, but not by way of limitation, this disclosure describes improved and automated techniques for intelligently identifying concept labels for a text fragment where the identified concept labels are representative of and semantically relevant to the information contained by the text fragment.

BACKGROUND

In today's information world, the ability to quickly interpret data and respond to that data is essential for the success of an organization or user. Users are bombarded with data on a regular basis and are required to comprehend the vast amounts of data in a relatively short span of time. For example, a user may have to manually sift through these vast amounts of data (e.g., multiple sections or pages of a document, multiple documents) to identify portions of data that are of interest to the user. Conventional tools and techniques that attempt to assist users in understanding and interpreting volumes of data are still quite limited in their capabilities and have their pitfalls.

SUMMARY

This disclosure relates generally to processing textual information. More specifically, but not by way of limitation, this disclosure describes improved and automated techniques for intelligently identifying concept labels for a text fragment where the identified concept labels are representative of and semantically relevant to the information contained by the text fragment.

In certain embodiments, a text fragment labeling system is disclosed. In certain embodiments, the text fragment labeling system generates, for each concept label in a first ordered list of concept labels determined for a text fragment, a new concept representation vector for the concept label. In certain examples, the new concept representation vector is generated by removing from a concept vector representation of the concept label contributions of all concept labels in a second ordered list of concept labels. The text fragment labeling system computes, for each concept label in the first ordered list of concept labels, a new relevance score for the concept label with respect to the text fragment using the new concept representation vector generated for the concept label. Then, the text fragment labeling system re-orders the concept labels in the first ordered list based on the new relevance scores computed for the concept labels in the first ordered list and includes a concept label placed at top of the re-ordered first ordered list in the second ordered list. In certain embodiments, the text fragment labeling system selects one or more concept labels from the second ordered list for inclusion in a final set of concept labels for the text fragment and outputs information identifying concept labels in the final set of concept labels.

In certain embodiments, the processing further comprises identifying, from a reference set of concept labels, a first subset of concept labels for the text fragment. In certain examples, each concept label in the first subset of concept labels is associated with a relevance score computed for the concept label for the text fragment. The processing then comprises ordering the concept labels in the first subset of concept labels to generate the first ordered list of concept labels. In certain examples, the ordering is performed based at least upon the relevance scores computed for the concept labels.

In certain embodiments, the ordering comprises ordering the concept labels in the first subset of concept labels in descending order based upon the relevance scores computed for the concept labels in the first subset of concept labels. In certain examples, the ordering further comprises ordering the concept labels in the first set of concept labels in descending order based upon the relevance scores computed for the concept labels in the first subset of concept labels to generate a first ordering and changing, based upon a user input or a user preference, a position of at least one concept label in the first ordering to generate the first ordered list.

In certain examples, the concept labels in the reference set of concept labels are titles of documents and for a concept label in the reference set of concept labels, the concept representation vector for the concept label is a vector representation of contents of a document of which the concept label is a title. In certain instances, the documents are Wikipedia articles and the reference set of concept labels are titles of the Wikipedia articles. In certain examples, the concept representation vector for a concept label in the reference set of concept labels is a set of term frequency-inverse document frequency (tf-idf) weights assigned to a set of words occurring in a document associated with the concept label.

In certain embodiments, as part of a first stage of processing, the text fragment labeling system identifies a first subset of concept labels for the text fragment by generating a text fragment vector for the text fragment. The processing further includes determining a degree of relevance between each concept representation vector associated with each concept label in the reference set of concept labels and the text fragment vector, computing the relevance score for each concept label based on the degree of relevance and based upon the relevance score computed for each concept label in the reference set of concept labels, identifying the first subset of concept labels for the text fragment.

In certain examples, the concept representation vectors for the reference set of concept labels are vectors in a multi-dimensional vector space of words and the text fragment vector for the text fragment is generated for the multi-dimensional vector space of words.

In certain examples, as part of a second stage of processing, the text fragment labeling system generates the new concept representation vector for each concept label in the first ordered list of concept labels by generating an orthonormal vector representation of the concept label by projecting the concept representation vector of the concept label onto the concept representation vector of one or more concept labels in the second ordered list of concept labels. In certain examples, the new concept representation vector for each concept label in the first ordered list of concepts labels is generated using a Gram-Schmidt orthogonalization technique.

In certain examples, as part of the second stage of processing, the text fragment labeling system computes the new relevance score for each concept label in the first ordered list of concept labels for the text fragment using the new concept representation vector generated for the concept label by computing the degree of relevance between a text fragment vector for the text fragment and a new concept representation vector generated for the concept label and computing the new relevance score for each concept label in the first ordered list of concept labels based on the degree of relevance.

In certain examples, the text fragment labeling system performs operations of generating, computing, re-ordering, including, and selecting until the first ordered list is empty. In certain examples, the text fragment labeling system performs operations of generating, computing, re-ordering, including, and selecting until a threshold number of concept labels are included in the second ordered list.

In certain examples, as part of the second stage of processing, the text fragment labeling system selects one or more concept labels from the second ordered list to be included in a final set of concept labels for the text fragment by re-ordering the concept labels in the second ordered list of concept labels in a descending order of the new relevance scores.

In certain examples, the text fragment labeling system outputs information identifying the concept label and outputs information indicative of the new relevance score computed for the concept label.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 illustrates an example of concept representation vectors generated for a reference set of concept labels and a text fragment vector generated for a text fragment, according to some embodiments.

DETAILED DESCRIPTION

Figure 1:
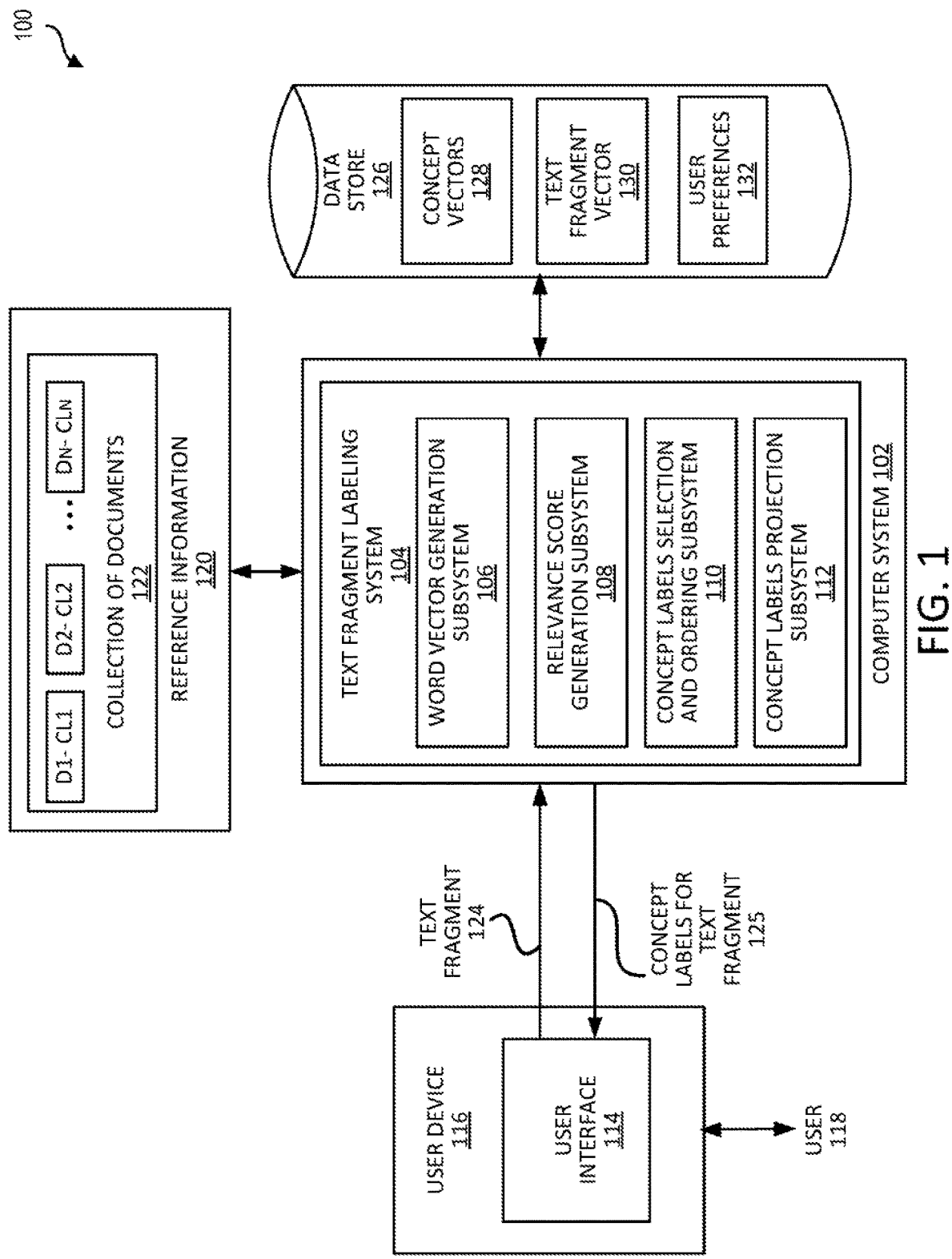
FIG. 1 depicts an example computing environment including a text fragment labeling system 104 that is configured to process text fragments as disclosed herein according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes improved and automated techniques for intelligently identifying concept labels for a text fragment where the identified concept labels are representative of and semantically relevant to the information contained by the text fragment. As indicated in the Background section, conventional tools and techniques that attempt to assist users in understanding and interpreting volumes of data are still quite limited in their capabilities and have their pitfalls. For example, some conventional techniques (e.g., text mining, word cloud tools) organize or summarize documents based upon the frequency of recurring patterns (e.g., words) in the documents. The output of these tools is however limited to words that actually occur in the document being analyzed, and many times this does not provide a meaningful, lucid, and interpretable representation of the information contained by the document. Some other tools attempt to perform topic detection for documents, but the analysis is restricted to a small set of predefined topics using pre-defined templates. These tools also assume that the topics are independent of each other and their results many times include redundant topics for a document. Further, these techniques are restricted to performing the analysis at the document-level and cannot be used for analyzing text fragments. Some existing tools attempt to apply supervised machine learning techniques for analyzing documents. However, there is no ground truth training data available and given the large number of potential concept labels, this is difficult to be performed as a classification task. Accordingly, existing techniques do not adequately solve the problem of identifying meaningful and relevant concept labels for a text fragment.

The various embodiments described in the present disclosure address the deficiencies of conventional techniques described above. A text fragment labeling system is disclosed that identifies, based upon the information contained in a text fragment, one or more concept labels that are representative of and semantically relevant to the information contained by the text fragment. The processing comprises multiple stages. In a first stage, based upon the contents of the text fragment, the text fragment labeling system determines, using a knowledge base storing information for a reference set of concept labels, a first subset of concept labels from the reference set that are relevant to the information contained by the text fragment. In certain embodiments, the knowledge base comprises a corpus of multiple documents and the titles of the documents correspond to the concept labels in the reference set of concept labels. In a particular implementation, the corpus of documents corresponds to Wikipedia articles/documents and the titles of the Wikipedia documents represent the reference set of concept labels. For instance, the reference set of concept labels could include approximately 30-40 million concept labels. As part of processing in the first stage, relevance or similarity scores are computed for each concept label in the reference set of concept labels and the text fragment, and based upon the computed scores, a first subset of concept labels are selected for the text fragment. For instance, the first subset of concept labels could include approximately 100 concept labels. In certain examples, the relevance or similarity scores are computed by determining the similarity between concept representation vectors associated with the concept labels and a text fragment vector generated for the text fragment. In certain embodiments, the text fragment vector and the concept representation vectors are vectors in a multi-dimensional vector space of words. In certain examples, the concept representation vectors and the text fragment vector comprise a set of term frequency-inverse document frequency (tf-idf) weights assigned to a set of words occurring in the multi-dimensional vector space of words.

The selected first subset of concept labels are then ordered based upon their relevancy scores to generate a first ordered list of concept labels from the first subset of concept labels. This first ordered list is the output of the first processing stage. In certain embodiments, the first ordered list comprises the first set of concept labels ordered in descending order based upon their associated relevance scores (e.g., the concept labels with the highest relevance score is at the top of the ordered list and the concept labels with the lowest relevance score is at the bottom of the ordered list). In some other embodiments, the first ordered list is first ordered in descending order based upon their associated relevance scores and the list is then reordered based upon one or more criteria such as user preferences. The reordered list is then output from the first stage of processing.

In a second stage, the text fragment labeling system performs dependency analysis using the first ordered list of concept labels generated in the first stage. The dependency analysis is performed to determine how dependent (e.g., redundant) or independent the concept labels in the ordered list of concept labels are with respect to each other. In certain embodiments, the Gram-Schmidt orthogonalization process is used to perform the dependency analysis. As a result of the dependency analysis, a new concept representation vector is generated for each concept label in the first ordered list of concept labels, where for a particular concept label in the first ordered list of concept labels, a new concept representation vector is generated for the particular concept label that reflects the contribution of that particular concept label to the text fragment by removing the contributions of all the other concept labels placed in a second ordered list of concept labels. Conceptually, the new concept representation vectors identify degrees of dependencies between the concept labels by identifying independent contributions of the concept labels in the first ordered list of concept labels. For each concept label in the first ordered list of concept labels, a new relevance score is computed for the concept label for the text fragment using the new concept representation vector generated for the concept label. As a result of this re-computation of the relevance scores, for a particular concept label in the first ordered list of concept labels that is dependent upon and redundant or overlapping with another concept label or concept labels in the first ordered list, the relevance score for that particular concept label is reduced compared to the score computed for the particular concept label in the first stage. One or more concept labels from the second ordered list are then selected to be included in a final set of concept labels for the text fragment. In certain embodiments, the second ordered list of concept labels are further ordered based upon the re-computed (new) relevance scores and a top few concept labels are selected to be part of the final set of concept labels. For example, the top "X" (e.g., 10) concept labels are selected from the second ordered list to be included in the final set of concept labels. In this second ordered list, dependent or redundant concept labels are pushed lower down the list, and as a result, concept labels from the ordered list that are more independent (e.g., more distinct and non-overlapping) of each other are more likely to be selected and include in the final set of concept labels. The selected concept labels are not only distinct and non-overlapping but also representative of and semantically relevant to the information represented by the text fragment.

Information identifying the selected concept labels in the final set of concept labels is then output for the text fragment. In certain embodiments, for each concept label in the final set of concept labels, information indicative of the recomputed relevance score for that concept label is also output along with the concept label. This enables a user to see both the selected concept labels for the text fragment along with their relative importance as represented by their associated relevance scores.

As described herein, the term "text fragment" refers to text containing multiple words. The multiple words in a text fragment may be organized in one line of text or multiple lines of text. The lines in a text fragment may be organized in one paragraph or multiple paragraphs of text. A text fragment may include words selected from the same information source (e.g., the same document or file) or selected and aggregated from multiple different information sources (e.g., from multiple different documents). For example, in one instance, a text fragment may include a paragraph from a document. While in some of the examples and embodiments described in this disclosure the text fragment corresponds to a paragraph, this is not intended to be limiting.

The following non-limiting example is used to introduce certain embodiments. In this example, a text fragment labeling system is executed on a computing system and assists a user with identifying concept labels for a text fragment that are relevant and representative of information contained by the text fragment, which may be input by the user. The user, using a user device, identifies a text fragment to be processed. The text fragment may be identified or selected by the user via a user interface or application executed by the user device. The user then sends a request to the text fragment labeling system to label the text fragment with one or more concept labels that are representative of the information contained by the text fragment. Upon receiving the request, in a first processing stage, the text fragment labeling system computes, for each concept label in a reference set of concept labels, a relevance score for the concept labels based upon the relevance or similarity of the concept labels to the text fragment. In certain examples, the text fragment labeling system may apply an approximation technique to reduce the computation of relevance scores for the concept labels. For example, based on the type of approximation technique chosen, the relevance scores for some concept labels may be inferred to be zero. In such cases, the text fragment labeling system may not compute the relevance scores for such concept labels thereby reducing the computation time required to compute the relevance scores. Based upon the computed relevance scores, a first subset of concept labels (e.g., {CL1, CL3, CL5, CL6, CL10}) is selected from the reference set of concept labels. A first ordered list of the first subset of concept labels is generated where the concept labels are ordered in descending order based upon their relevance scores. For example, the first ordered list may be (CL3, CL1, CL10, CL5, CL6). In a second stage, the text fragment labeling system performs dependency analysis using the Gram-Schmidt orthogonalization process and then re-computes the relevance scores based upon the dependency analysis. The concept labels in the first ordered list are then re-ordered based upon the re-computed scores to generate a second ordered list of concept labels that may be as follows: (CL3, CL10, CL5, CL1, CL6). From this second ordered list of concept labels, the top three concept labels, namely, CL3, CL10, and CL5 are selected for the text fragment. The concept labels are then associated with the text fragment and output as being representative of the information contained in the text fragment. In certain embodiments, for each label corresponding to a selected concept label, the re-computed relevance score associated with those concept labels is also output along with the concept labels.

Referring now to the drawings, FIG. 1 depicts an example computing environment 100 including a text fragment labeling system 104 that is configured to process text fragments as disclosed herein according to certain embodiments. Text fragment labeling system 104 may be implemented by one or more computing systems 102. For example, the one or more computing systems 102 may execute computer-readable instructions (e.g., code, program) to implement text fragment labeling system 104. As depicted in FIG. 1, text fragment labeling system 104 includes various subsystems including a word vector generation subsystem 106, a relevance score generation subsystem 108, a concept labels selection and ordering subsystem 110, and a concept labels projection subsystem 112. Portions of data or information used by or generated by text fragment labeling system 104 as part of its processing may be stored in a persistent memory such as data store 126. The systems and subsystems depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Computing environment 100 depicted in FIG. 1 is merely an example and is not intended to unduly limit the scope of claimed embodiments. One of ordinary skill in the art would recognize many possible variations, alternatives, and modifications. For example, in some implementations, the text fragment labeling system 104 can be implemented using more or fewer subsystems than those shown in FIG. 1, may combine two or more subsystems, or may have a different configuration or arrangement of subsystems.

As depicted in FIG. 1, a user 118 may interact with text fragment labeling system 104 using a user device 116 that is communicatively coupled to text fragment labeling system 104, possibly via one or more communication networks. User device 116 may be of various types, including but not limited to, a mobile phone, a tablet, a desktop computer, and the like. User 118 may interact with text fragment labeling system 104 using an application (e.g., a browser) executed by user device 116. For example, user 118 may use a user interface (UI) 114 (which may be a graphical user interface (GUI)) of an application executed by user device 116 to interact with text fragment labeling system 104. For example, user 118 may, via UI 114, select or input a text fragment 124 and send a request to text fragment labeling system 104 to determine concept labels for the text fragment 124. The text fragment 124 is then communicated from user device 116 to text fragment labeling system 104 for analysis.

Upon receiving the request from user device 116, text fragment labeling system 104 performs processing to identify a set of concept labels for the text fragment. The results 125 of the processing performed by text fragment labeling system 104 are then communicated back to the requesting user device 116. These results 125 may include concept labels identified by text fragment labeling system 104 as being relevant to text fragment 124, relevance scores associated with the concept labels, and possibly other information included in the results. The results 125 along with the text fragment 124 may be output to user 118 via UI 114. Details related to the processing performed by the various systems and subsystems in FIG. 1 for generating concept labels for a text fragment are described below with respect to the flowchart depicted in FIG. 2 and the accompanying description.

Figure 2:
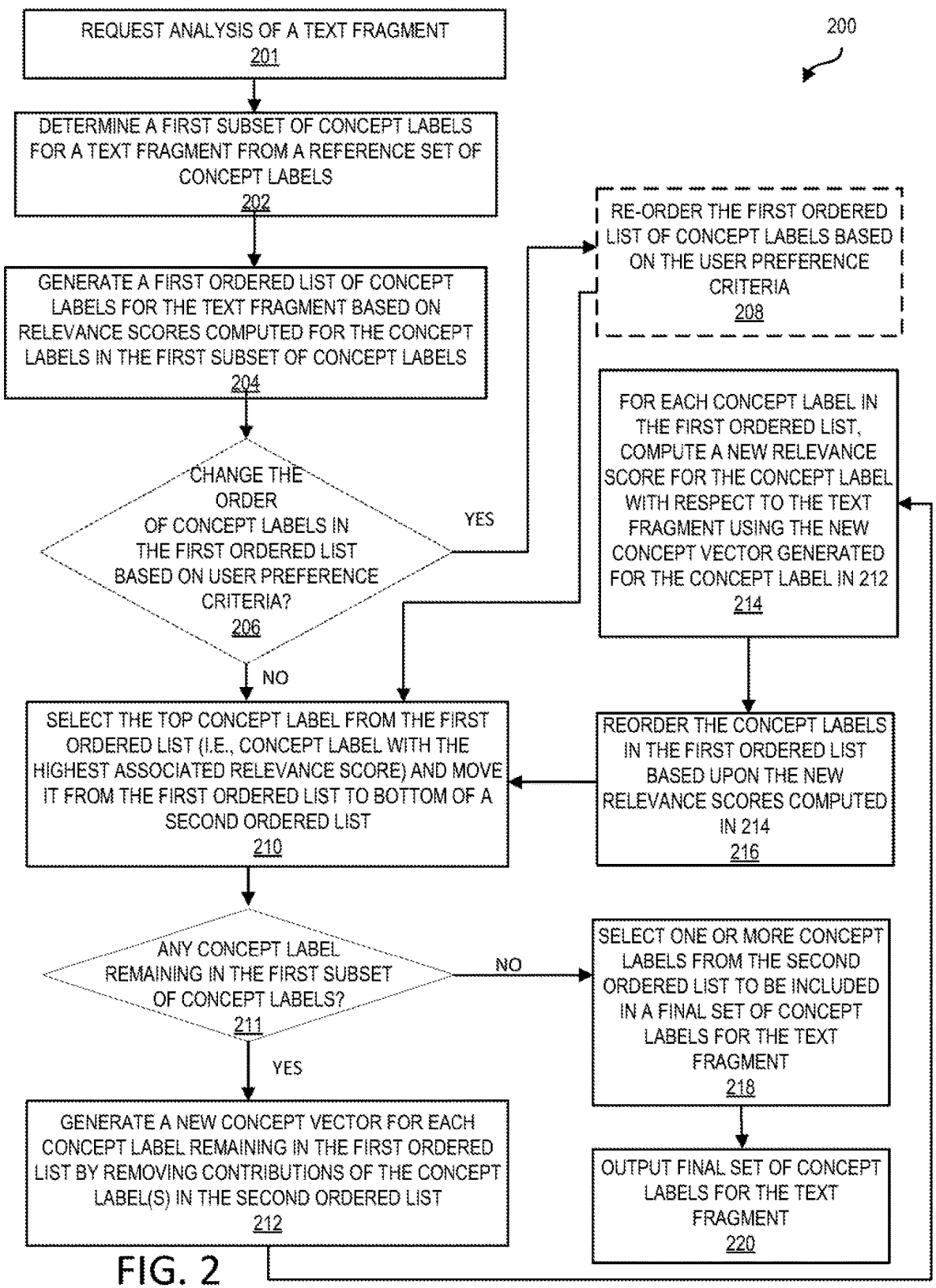
FIG. 2 depicts an example of a process for identifying concept labels for a text fragment, according to certain embodiments.

FIG. 2 depicts an example of a process 200 for identifying concept labels for a text fragment, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by text fragment labeling system 104. In certain embodiments, within text fragment labeling system 104, the processing in 202-220 may be performed by one or more subsystems of the text fragment labeling system.

In the embodiment depicted in FIG. 2, processing is initiated when, in 201, a request is received requesting analysis of a text fragment. For example, text fragment labeling system 104 may receive a signal from user device 116 indicating that a user 118 of the client device has requested a particular text fragment to be analyzed for purposes of identifying concept labels that are applicable for the text fragment. For example, in the embodiment depicted in FIG. 1, user 118 may use UI 114 to select a text fragment 124 for which applicable concept labels are to be identified. This may then be communicated from user device 116 to text fragment labeling system 104.

The text fragment for which analysis is to be performed can be of different types. The text fragment may include multiple words, multiple lines, a paragraph, one or more portions of a paragraph or multiple paragraphs selected from one or more sources of information. In some examples, text fragment 124 may represent lines selected from a single source of information (e.g., a document). For example, user 118 may open a document using a text editor application executed by user device 116 and then select a text fragment from the document. As another example, a user 118 may select a text fragment from a web page displayed by a browser. The UI of the text application, or browser, or any other application may provide a user-selectable option that initiates a request for processing the selected text fragment and causes the request to be communicated to text fragment labeling system 104. For example, a "Generate Concept Label" user-selectable option (e.g., a menu item, button) may be provided by UI 114. User 118 can select (e.g., click the button) this option to cause the request to be communicated to text fragment labeling system 104, and which triggers the processing depicted in FIG. 2.

At block 202, a first subset of concept labels including concept labels that are applicable for the text fragment are identified from a reference set of concept labels. The reference set of concept labels include a global set of concept labels from which concept labels applicable to the text fragment are selected. In certain embodiments, as part of the processing in 202, for each concept label in the reference set of concept labels, a relevance score is computed for the concept label where the relevance score indicates a degree of applicability or relevance of the concept label to the contents of the text fragment. A first subset of concept labels is then determined for the text fragment by selecting concept labels from the reference set based upon the relevance scores computed for the concept labels.

Information regarding the reference set of concept labels may be stored in a knowledge base (e.g., reference information 120 in FIG. 1). In certain examples, the reference set of concept labels correspond to titles of documents stored in reference information 120. For example, as depicted in FIG. 1, reference information 120 comprises a collection of documents 122 (e.g., D1, D2, . . . Dn) and each document comprises information identifying a concept label. For example, document D1 may identify concept label CL1, and document D2 may identify concept label CL2, and so on. In certain embodiments, each document contains some content and the concept label corresponds to the title of the document, where the title is representative of the contents of the document. In certain embodiments, text fragment labeling system 104 uses the set of Wikipedia articles as the knowledge base for its processing. For example, the reference information 120 includes Wikipedia articles and the titles of the Wikipedia articles are the concept labels. In such an embodiment, the titles of the Wikipedia articles make up the reference set of concept labels that is used by text fragment labeling system 104 for its processing in FIG. 2 (and FIG. 3).

Reference information 120 may be stored in a location accessible to text fragment labeling system 104. The reference information may be stored in a location local to text fragment labeling system 104 or in a remote location such as in a cloud storage location accessible to text fragment labeling system 104. Text fragment labeling system 104 then accesses this reference information and uses it for identifying concept labels that are representative of and semantically relevant to the information contained by the text fragment.

In certain examples, to facilitate the processing in 202, the text fragment to be analyzed is represented by a text vector that is representative of the contents of the text fragment. Each concept label in the reference set of concept labels is also represented by a concept representation vector that is representative of the concept label. For example, in an embodiment where Wikipedia articles are used and the titles of the Wikipedia articles represent the reference set of concept labels, for each concept label in the reference set, the concept label corresponds to a particular title of a particular Wikipedia article and the concept representation vector for that concept label is representative of the contents of that particular Wikipedia article. The concept representation vector for a reference concept label may comprise a set of weights assigned to words that occur in a document corresponding to the concept label. In certain embodiments, the weights assigned to the words may be based upon the frequency of the words occurring in the document. For example, in the Wikipedia articles usage case, the concept representation vector for a particular Wikipedia article may be a multidimensional vector corresponding to words occurring in the particular Wikipedia article and the vector may include weights assigned to words where the weights are based upon the frequency of the words in that particular Wikipedia article. Additional details related to the processing performed in 202 by text fragment labeling system 104 for determining a first subset of concept labels for a text fragment is described in FIGS. 3-4.

Figure 3:
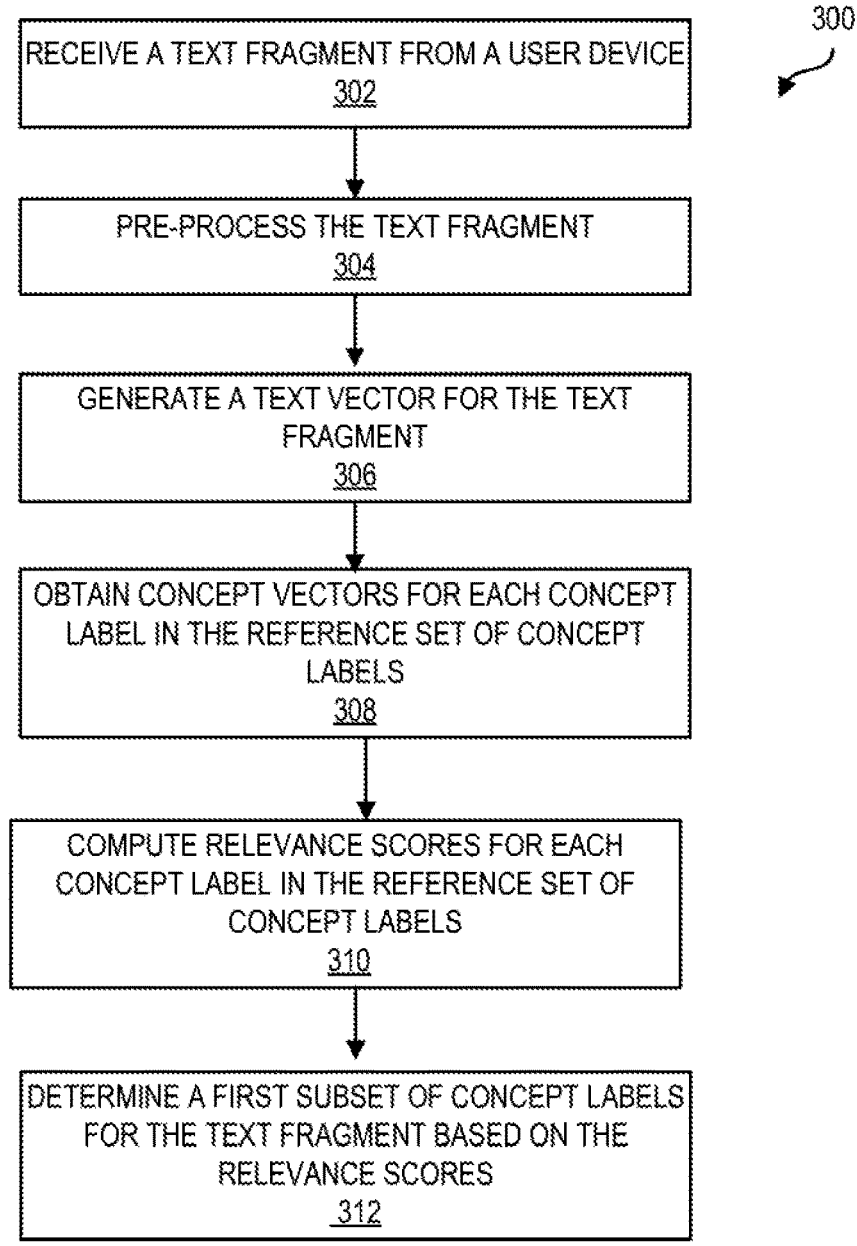
FIG. 3 depicts an example of a process for determining a first subset of concept labels for a text fragment based on relevance scores computed for the concept labels according to certain embodiments.

FIG. 3 depicts an example of a process 300 for determining a first subset of concept labels for a text fragment according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 3, the processing depicted in blocks 302-312 in FIG. 3 are performed by word vector generation subsystem 106 and relevance score generation subsystem 108 (e.g., as a result of executing step 201 in FIG. 2) for the text fragment.

At block 302, text fragment labeling system 104 receives the text fragment from the user device. At block 304, text fragment labeling system 104 pre-processes the given text fragment. In some examples, pre-processing the text fragment involves cleaning and simplifying the content of the text fragment to derive meaningful features from the text fragment. Text fragment labeling system 104 may utilize various Natural Language Processing techniques known in the art such as resolving co-referencing pronouns (e.g., when two or more expressions in a text refer to the same person or thing), removing stop words (e.g., commonly used words such as "the), removing certain classes of characters such as numbers, special characters, and sequence of repeated characters, and lemmatization (a process which converts multiple related words to a single canonical form) to pre-process the given text fragment.

At block 306, text fragment labeling system 104 generates a word vector representation for the text fragment (also referred to herein as a "text fragment vector"). In certain examples, a text fragment vector for the text fragment comprises a set of "tf-idf" (term frequency-inverse document frequency) weights assigned to a set of words occurring in the text fragment. Details related to the processing performed by text fragment labeling system 104 to generate a text fragment vector for a text fragment is described in FIG. 4.

At block 308, text fragment labeling system 104 obtains a word vector representation (i.e., a concept representation vector) for each concept label in the reference set of concept labels. Details related to the processing performed to generate concept representation vectors for concept labels is described in FIG. 4.

FIG. 4 illustrates an example of concept representation vectors generated for a reference set of concept labels and a text fragment vector generated for a text fragment, according to some embodiments. In certain embodiments, word vector generation subsystem 106 within text fragment labeling system 104 is configured to generate the concept representation vectors and the text fragment vector. In the embodiment shown in FIG. 4, each concept label {CL1, CL2, CL3, . . . CLn} is associated with a concept representation vector (402A-402N) representing the concept label. Each concept representation vector (402A-402N) is a vector representation of the content of a document corresponding to a concept label and is generated in a multi-dimensional vector space of words 400. In certain examples, each concept representation vector (402A-402N) is represented as a set of "tf-idf" (term frequency-inverse document frequency) weights assigned to a set of words occurring in a document associated with a concept label {CL1, CL2, CL3, . . . CLn} representing the concept representation vector. As described herein, the "tf-idf" weight refers to a type of statistical measure that is used to evaluate the importance of a word occurring in a document associated with a concept label. A word from the multi-dimensional vector space of words 400 that occurs in a concept label associated with a document is assigned a non-zero value in the concept representation vector for the concept label. A word that does not occur in the concept label is assigned a zero value in the concept representation vector for the concept label.

In a certain implementation, the "tf-idf" weight is composed of two terms: a term frequency (tf) and an inverse document frequency (idf). The term frequency (tf_di(w)) is a measure of how frequently a word 'w' occurs in a specific document di. The term frequency (tf) for a word is computed as shown in equation (1) and reproduced below:

$tf\_di(w)$=(Number of times word $w$ appears in a document $di$)/(Total number of words in a set of documents).      Equation 1

The inverse document frequency (idf) measures the importance of a word in the document and is computed as the logarithm of the total number of documents divided by the number of documents where the specific word appears. The inverse document frequency (idf) is computed as shown in equation (2) and reproduced below:

$idf(w)$=log 10(Total number of documents/Number of documents with word '$w$' in it).      Equation 2

The "tf-idf" weight for a word for a given document is then computed as a product of the term frequency (tf) of the word in that document and its inverse document frequency (idf). For purposes of the example shown in FIG. 4, a document associated with the concept label CL1 may be composed of 100 words where a particular word "w1" appears 3 times in the document. The "tf_d1" for the word "w1" is computed as 3/100=0.03. If the reference set of concept labels comprises a hundred thousand concept labels, and the word "w1" appears in a 1000 of these concept labels, the "idf" for the word "w1" is computed as log(100000/1000)=2. Thus, the "tf-idf" weight of the word "w1" for the document associated with the concept label CL1 is the product of the "tf" and the "idf" for the word which is, 0.03*2=0.06.

In certain examples, the text fragment vector 404 for the text fragment is generated in the same multi-dimensional vector space of words 400 used to generate the concept representation vectors for the reference set of concept labels. In one example, the text fragment vector 404 for the text fragment is represented as a set of "tf-idf"(term frequency-inverse document frequency) weights assigned to a set of words occurring in the text fragment. For instance, the tf-idf weight for a word "w1" in the text fragment vector for the text fragment is computed as a product of its "tf" and the "idf". For example, the text fragment vector for a text fragment T1 is represented as shown below:

Text Fragment Vector for T1=(tf-idf(W1), tf-idf(W2), tf-idf(W3), . . . tf-idf(Wn)). where tf(w1) is computed as the number of times a word "w1" appears in the text fragment divided by the total number of words in the text fragment and idf(w1) is computed as the logarithm of the total number of concept labels in the reference set of concept labels divided by the number of concept labels where the specific word appears.

In certain examples, the text fragment vector (e.g., obtained as a result of executing block 306) and the concept representation vectors (obtained as a result of executing block 308) may be stored in data store 126. In certain examples, the text fragment vector and the concept representation vectors may be represented and stored as compatible vectors/matrices having corresponding equal dimensions of rows and columns for comparison and similarity analysis as discussed below.

Data store 126 may be an internal or external persistent storage location utilized by text fragment labeling system 104 for storing portions of data or information used by or generated by text fragment labeling system 104 as part of its processing. For instance, data store 126 may store a set of concept representation vectors 128 for the reference set of concept labels and a text fragment vector (e.g., 130) generated for a text fragment. In certain instances, as part of the processing performed in block 308, word vector generation subsystem 106 may be configured to periodically determine if reference information 120 has changed and generate new and/or modified concept representation vectors for the newly added/modified documents in reference information 120. Similarly, word vector generation subsystem 106 may be configured to periodically delete concept representation vectors (e.g., stored in data store 126) for documents that have been deleted in reference information 120. In this manner, word vector generation subsystem 106 generates and maintains an updated set of concept representation vectors 128 for the reference set of concept labels corresponding to the collection of documents 122.

Returning to the discussion of FIG. 3, at block 310, the processing involves computing a relevance score for each concept label in the reference set of concept labels. The relevance score is indicative of a degree of relevance of each concept label to contents of the text fragment and is computed using the concept representation vector for the concept label. In one approach, the relevance score for each concept label in the reference set of concept labels is computed by determining the degree of relevance between each concept representation vector associated with each concept label and the text vector. In one implementation, the degree of relevance is determined by computing the cosine similarity between each concept representation vector associated with each concept label and the text vector. The relevance score for each concept label in the reference set of concept labels is then computed based on the cosine similarity. In one example, the cosine similarity is computed as a function (i.e., a cosine) of the angle between each concept representation vector associated with the concept labels and the text fragment vector for the text fragment in the multi-dimensional vector space of words. The cosine similarity between two vectors (e.g., a concept labels vector $\vec{a}$ and the text fragment vector $\vec{b}$) may be computed as shown in Equation (3) and reproduced below:

$$Cos\theta = \frac{\vec{a}\cdot\vec{b}}{||\vec{a}||||\vec{b}||} = \frac{\sum_{1}^{n} a_i b_i}{\sqrt{\sum_{1}^{n} a_i^2}\sqrt{\sum_{1}^{n} b_i^2}}$$      Equation 3 where $\vec{a} \cdot \vec{b} = \sum_{1}^{n} a_i b_i = a_1 b_1 + a_2 b_2 + \ldots + a_n b_n$ is the dot product of the two vectors.

At block 312, a first subset of concept labels are determined based on the relevance scores computed in 310. In some examples, the first subset of concept labels may include all the concept labels in the reference set of concept labels. In other examples, the first subset of concept labels may be selected by identifying concept labels in the reference subset of concept labels having relevance scores greater than a certain threshold value. The threshold value may be a pre-configured value (e.g., between 0-1) that is set by text fragment labeling system 104 while processing text fragments.

Returning to the discussion of FIG. 2, as described above, in 202, a first subset of concept labels is determined for the text fragment based upon relevance scores computed for the concept labels in the reference set of concept labels and the text fragment. At block 204, the concept labels in the first subset of concept labels are ordered based upon their associated relevance scores (e.g., the relevance scores computed in FIG. 3) to generate a first ordered list of concept labels for the text fragment. In certain embodiments, the concept labels are ordered in descending order based upon their associated relevance scores such that the concept label with the highest associated relevance score is at the top of the first ordered list and the concept label with the lowest relevance score is at the bottom of the first ordered list, and in general, a concept label with a higher associated relevance score is placed higher in the first ordered list than a concept label with a lower relevance score.

In certain examples, at block 206, a check is performed (e.g., by concept labels selection and ordering subsystem 110) to determine whether the order of the concept labels in the first ordered list (generated in block 204) should be changed or modified based upon other criteria such as user preference criteria or user inputs. If it determined in 206 that the order is to be changed, then the first ordered list is reordered in 208 (e.g., by concept labels selection and ordering subsystem 110) and processing then continues with block 210. If it is determined in 206 that no change is to be made, then processing proceeds with block 210. In certain embodiments, the processing performed in blocks 206 and 208 is optional.

Various different conditions may cause the first ordered list to be reordered in 208. In certain embodiments, concept labels selection and ordering subsystem 110 may determine whether or not the first ordered list is to be reordered based upon user input, user preferences, or other criteria. For example, in some instances, information identifying the order of the concept labels in the first ordered list may be output to the user, the user given the choice of changing the order. The user may provide inputs indicating a change in the order via UI 114. For example, the user may indicate that a particular concept label in the first ordered list is to be moved from its current position in the first ordered list to the top of the first ordered list. Text fragment labeling system 104 may receive this user preference input and change the order of the concept labels in the first ordered list of concept labels such that the user selected concept label is placed at the top of the first ordered list.

As another example, text fragment labeling system 104 may decide to automatically, without any user input, change the order of concept labels in the first ordered list based upon user preferences, such as prior user history. For example, the user may have indicated in the past that a particular concept label is to be placed at the top of the first ordered list (e.g., potentially because that particular concept label is of importance to the user). Alternatively, text fragment labeling system 104 may determine based upon information stored for the user that a particular concept label is preferred or is of importance to the user. Text fragment labeling system 104 may use this information to change the order of the concept labels in the first ordered list in 208 such that the particular concept label is placed at a higher position in the first ordered list than its original position. Accordingly, in some situations, the first ordered list may be automatically re-ordered in 208 based on user's past preference information 132 (stored in data storage system) that indicates the user's preference towards certain concept labels which are in the first ordered list of concept labels.

At block 210, the concept label at the top of the first ordered list is selected and moved from the first ordered list to the bottom of a second ordered list. The second ordered list is initialized to a null set at the start of the processing depicted in FIG. 2.

At block 211, a check is made to determine if a threshold condition is met. In certain examples, the threshold condition is met when there are no more concept labels remaining in the first ordered list, i.e., all concept labels in the first ordered list have been processed and moved to the second ordered list. In some embodiments, in addition to the checking for any concept labels in the first ordered list, additionally a check is made to see if a threshold number of concept labels are already included in the second ordered list of concept labels. If the threshold condition is met, then the processing proceeds to block 218 (described below) to select one or more concept labels from the second ordered list to be included in a final set of concept labels for the text fragment. If the threshold condition in 211 is not met, then the processing proceeds with block 212.

At block 212, for each concept label remaining in the first ordered list, a new concept representation vector is generated for the concept label by removing, from the concept representation vector originally generated for the concept label, the contributions of the concept label(s) in the second ordered list. The new concept representation vector reflects the contribution of that particular concept label by removing the contributions of the concept labels in the second ordered list. In the embodiment depicted in FIG. 1, concept labels projection subsystem 112 within text fragment labeling system 104 is configured to generate the new concept representation vectors for the concept labels.

Various different techniques may be used to generate the new concept representation vectors in 212. In certain examples, the new concept representation vector for each concept label in the first ordered list of concepts labels is generated using a Gram-Schmidt orthogonalization technique. In one approach, the new concept representation vectors (also referred to herein as the orthonormal vector representations) for the concept labels may be computed as shown in equation (4) and reproduced below:

$$\phi_i = c_i - \sum_{k=1}^{i-1} (c_i \cdot \phi_k) \phi_k \qquad \text{Equation 4}$$

where $\{\phi_1, \phi_2, \ldots, \phi_n\}$ denote the orthonormal vector representations for a set of concept labels and $(c_i \cdot \phi_k)\phi_k$ denotes the projection operator that projects the vector $c_i$ orthogonally onto the line spanned by the vector $\phi_i$. For instance, based on equation (4), the orthonormal vector representation ($\phi_2$) for a concept label CL2 is a unit vector generated by projecting the concept representation vector for the concept label CL2 onto the concept representation vector for the concept label CL1 to remove the contribution of CL1 in the concept representation vector for CL2. The orthonormal vector representation ($\phi_2$) for concept label CL2 thus is a unit vector representation of CL2 without the contributions of the concept label CL1 and its coefficient represents the contribution of CL2 without the contribution due to CL1. Based on the orthonormal vector representation ($\phi_2$), the relevance scores associated with the concept label CL2 are recomputed.

At block 214, for each concept label in the first ordered list, a new relevance score is computed for the concept label with respect to the text fragment using the new concept vector generated for the concept label in block 212. In certain examples, re-computing a relevance score for a concept label comprises determining a degree of similarity (e.g., cosine similarity) between the text fragment vector for the text fragment and the new concept representation vector (orthonormal vector representation) generated for the concept label in 212. In one implementation, the degree of similarity is determined by computing the cosine similarity between the text fragment vector for the text fragment and the new concept representation vector (orthonormal vector representation) generated for the concept label. The new relevance score for each concept label in the first ordered list of concept labels is then computed based on the cosine similarity. The new relevance value computed for a concept label in 214 may be the same as or different from relevance values previously computed for the concept label in 202 or in previous iterations of 214. Details regarding the manner in which the cosine similarity between two vectors can be determined is discussed with respect to FIGS. 3-4.

At block 216, the concept labels remaining in the first ordered list are reordered based upon the new relevance scores computed in block 214. Processing then continues with block 210.

As previously described above, in 206 and 208, the ordering of the concept labels in the first ordered list may be changed based upon user inputs or preferences, or other criteria. In certain embodiments, after the reordering of the concept labels in the first ordered list in 216, the ordering of the concept labels in the reordered first ordered list may optionally be changed based upon user inputs or preferences, or other criteria. For example, the user may be given the option of providing input to change the order of the concept labels in the first ordered list. The first ordered list with the changed ordering is then used for the subsequent processing 210.

The second ordered list identifies the concept labels selected from the first ordered list and the order of the concept labels in the second ordered list indicates the order in which the concept labels were selected from the first ordered list and moved to the second ordered list. The higher the position of a concept label in the second ordered list, the more relevant or applicable the concept label is to the text fragment. In certain embodiments, the number of concept labels in the second ordered list is lesser than the number of concept labels in the first ordered list, i.e., the first ordered list includes at least one concept label that is not included in the second ordered list.

After the threshold condition in 211 is met and processing proceeds with 218, the second ordered list includes one or more concept labels selected from the first subset of concept labels, and the order of the concept labels in the second ordered list indicates the order in which the concept labels were selected for inclusion in the second ordered list. The higher the position of a concept label in the second ordered list, the more relevant the concept label is to the text fragment compared to a concept label positioned lower in the second ordered list.

At block 218, a final set of concept labels for the text fragment is generated by selecting one or more concept labels from the second ordered list of concept labels. In certain examples, all the concept labels in the second ordered list may be selected for inclusion in the final set. In other examples, a top few (e.g., top 5, top 10, etc.) concept labels from the second ordered list may be selected for inclusion in the final set. In certain embodiments, the number of concept labels to be included in the final set of concept labels may be pre-configured. The relative ordering of the selected concept labels from the second ordered list is also retained in the final set. In certain embodiments, the final set is itself an ordered list that includes the top "X" concept labels from the second ordered list and the ordering of the concept labels is per their ordering in the second ordered list.

At block 220, information identifying the concept labels in the final set of concept labels is output to the requesting user. For example, information related to the final set of concept labels may be communicated from text fragment labeling system 104 to user device 116 and output to user 118 via UI 114. The information output to the user may identify the concept labels in the final set and also identify the order of the concept labels in the second ordered list, where the order indicates a degree of applicability of the concept label to the text fragment. A concept label placed higher in the second ordered list is more applicable or relevant to the text fragment than a concept label lower placed in the second ordered list. In certain embodiments, relevance scores associated with the concept labels in the final set of concept labels may also be output. For example, for a concept label, the relevance score associated with the concept label when the concept label was selected for inclusion in the second ordered list may be output. In other embodiments, other information may be output indicating a degree of relevance of the concept labels to the text fragment.

As a result of generating new concept representation vectors in block 212, the computing of new relevance scores in block 214, reordering of the first ordered list based upon the recomputed relevance scores in block 216, and selecting the top concept label from this reordered first ordered list in 210 for inclusion in the second ordered list, and then selection of concept labels from the second ordered list for inclusion in the final set of concept labels per the processing 218, concept labels that are more independent (e.g., more distinct with reduced overlap in the meaning conveyed by the concept labels) of each other are more likely to be selected in the second ordered list and subsequently in the final set of concept labels. This is enabled due to the generation of the new concept representation vectors in 212 since the contributions of the concept labels already selected in the second ordered list are removed during the regeneration of the new concept representation vectors. The selected concept labels are not only distinct with reduced overlap but also representative of and semantically relevant to the information represented by the text fragment. The concept labels selected in the final set and their order thus conveys more useful information about the contents of the text fragment than conventional techniques.

The processing performed by text fragment processing system in blocks (212-220) can be better understood using the following example. For example, concept labels projection subsystem 112 may generate a first ordered list of concept labels comprising three concept labels {CL1, CL2, CL3} for a text fragment that are ordered in decreasing order of their respective relevance scores {R1, R2, R3}. As an example, assume that the concept labels {CL1, CL2, CL3} correspond to{CL1: Edinburg University Press, CL2: Research University, CL3: Cosmogony} respectively. Concept labels, CL1: A and CL2: B are highly correlated because both these concept labels are linked to similar information. These concept labels are also highly relevant to the content described in the text fragment because they are both associated with high relevance scores. However, the information gained by assigning two highly correlated concept labels such as CL1 and CL2 to a text fragment is minimal and only contributes to a marginal information gain in the set of the concept labels identified for the text fragment.

In certain examples, this information is captured in the orthonormal vectors $\phi_1$ and $\phi_2$ generated for the concept labels. Due to the high correlation between these concept labels, concept label CL2 will have a significant contribution of CL1, and once the contribution of CL1 is removed by orthonormalizing the concept representation vector for CL2 to produce $\phi_2$, the relevance score for CL2 also decreases. The new (i.e., re-computed) relevance score thus acknowledges the additional contribution that the concept label CL2 makes to the text fragment, i.e., in addition to the concept label CL1 already selected for the text fragment. In some instances, the text fragment labeling system reduces the inclusion of the concept label (CL2: Research University) if the contribution of this concept label to the text fragment is minimal. For example, after the generation of the new concept representation vectors and the reordering of the concept labels based on the re-computed (new) relevance scores, the re-ordered list that is generated may be as follows: {CL1: Edinburg University Press, CL3:Cosmogony; CL2: Research University} and only CL1 and CL3 may be selected for the text fragment. In this manner, the text fragment labeling system intelligently determines concept labels for a text fragment that are both meaningful (i.e., distinct and non-overlapping) and semantically relevant to the information represented by the text fragment.

Additional details related to the operations performed by text fragment labeling system 104 and the subsystems (e.g., word vector generation subsystem 106, relevance score generation subsystem 108, concept labels selection and ordering subsystem 110 and concept labels projection subsystem 112) within text fragment labeling system 104 to identify concept labels for a text fragment are now described using the following examples.

As described above, for identifying concept labels relevant to the text fragment, text fragment labeling system 104 starts with using the reference set of concept labels and identifies a first subset of concept labels from the reference set that are relevant for the text fragment. For example, the reference set of concept labels may correspond to titles of Wikipedia articles, in which case the reference set of concept labels can include 30 million to 40 million reference concept labels. Further, given the nature of Wikipedia, the corpus of Wikipedia articles is dynamic and ever growing and thus the reference set is dynamic. The first subset of concept labels that is identified for the text fragment from the reference set may include a very reduced subset of concept labels from the reference set. For example, in typical embodiments (although this is not intended to be limiting), the number of concept labels in the first subset may be a small percentage of the concept labels in the reference set (e.g., less than 10% of the reference set, less than 1% of the reference set, etc.). For example, in the case of Wikipedia articles, the number of concept labels in the first subset of concept labels may be less than a hundred concept labels. Finally, the number of concept labels in the final set of concept labels for the text fragment is a small subset of the concept labels in the first subset. For example, the final set may include 1-10, 1-20, etc. concept labels. In this manner, text fragment labeling system 104 can use a large number of concept labels as reference and identify a small user-friendly number of concept labels relevant for the text fragment. Further, as described above, the concept labels in the final set are carefully chosen such that the concept labels are independent and there is reduced overlap in meaning between the concept labels.

EXAMPLE #1

The first example shown below illustrates the manner in which concept labels can be determined for an exemplary text fragment, T1 shown below:

| Text Fragment - T1 |
|---|
| Before we go into the weird and wonderful depth of trying to explain this question, we first have to understand what is meant when we refer to the word 'universe'. The universe is everything. It is all the galaxies, stars black holes and planets, right down to matter, particles and energy. It is the "total sum of all that exists, the physical system that encapsulates all known space" (reference no. 5). But where did it come from? It all stems from the Big Bang theory, which suggests that if the universe is expanding, there must have been a point (ie right at the beginning of time) where the universe existed as a single particle, of infinite density. It is important to remember that the Big Bang theory represents not only the beginning of the universe, but also the beginning of time itself, about 15 billion years ago. As Stephen Hawking suggests, the beginning of real time would have been a singularity, at which the laws of physics would have broken down. |

The word vector representation (i.e., the text fragment vector) for the text fragment T1 is shown below. In one example, the text fragment vector is generated as a result of executing step 306 of FIG. 2 after processing is applied on the text fragment (e.g., in step 304 of FIG. 3).

| Text Fragment Vector for text fragment T1 |
|---|
| universe-26.4498, beginning-16.5259, bang-15.8362, encapsulates-12.3376, suggests-12.2646, we-12.2041, hawking-11.2119, singularity-11.0102, theory-10.6629, galaxies-10.3344, ie-9.3392, weird-8.5558, particle-8.5327, big-8.4115, planets-8.3181, particles-8.2777, infinite-8.0821, stems-7.9499, holes-7.6323, wonderful-7.6057, right-7.1643, sum-6.9848, expanding-6.9797, remember-6.9617, explain-6.8966, physics-6.5538, understand-6.4301, depth-6.2887, exists-6.2638, billion-6.1996, ago-6.1972, existed-6.1551, represents-5.9331, density-5.8823, everything-5.7627, question-5.6922, laws-5.6871, trying-5.5881, meant-5.5672, matter-5.5528, broken-5.4848, stephen-5.2464, energy-5.1973, physical-5.0495, reference-5.0384, word-4.8859, stars-4.7542, refer-4.6359, space-4.4711, must-4.3854, itself-4.3581, real-4.2538, come-4.2024, go-3.9362, important-3.8349, black-3.6683, point-3.5599, system-3.3705 |

The example further illustrates a concept representation vector generated for a concept label CL1 (titled "Cosmogony"). For instance, the concept representation vector for the concept label CL1 can be obtained as a result of executing step 308 of FIG. 3. In this example, the concept label CL1 is associated with a document in the collection of documents 122 stored in reference information 120. In certain embodiments, the document represents a Wikipedia article and the title ("Cosmogony") of the Wikipedia article represents the concept label CL1 for the article. It should be noted that for purposes of illustration, only a partial portion of the concept representation vector for the concept label CL1 is shown below.

| Concept representation vector for Concept label CL1 - "Cosmogony" |
| --- |
| Universe-152.0861, cosmogony-106.8686, singularity-66.0615, cosmology-60.2629, theory-53.3143, myths-52.0075, theories-50.2050, cosmological-44.9724, creation-41.4227, string-31.9529, scientific-31.9385, bang-31.6724, cosmos-27.8042, origin-26.2813, quantum-24.8404, existence-22.6350, mythology-22.4256, hawking-22.4239, gods-22.1326, theoretical-21.7024, physicists-20.5308, planck-19.9881, emerged-19.1934, instance-18.6631, space-17.8844, scenarios-17.8178, explanations-17.8048, ideas-17.5852, cosmic-17.1651, big-16.8231, regarding-16.7849, genesis-15.9139, myth-15.5397, gravity-15.4426, humanities-15.3964, proposed-15.1106, egg-15.0552, explanation-14.4320, ruler-14.0778, moments-14.0087, model-13.8024, explain-13.7932, explains-13.6648, characteristic-13.5427, researchers-13.3871, testable-13.1843, jove-12.7288, extrapolation-12.3376, does-12.2693, untested-12.1127, koine-11.9694, origins-11.9216, copulation-11.8187, boundless-11.7954, earliest-11.6603, primeval-11.4966, astrophysical-11.3856, exist-11.3335, limitless-11.3059, sumerian-11.1509, yau-10.8475, inquire-10.8048, formulating-10.7362, exemplifies-10.7220, frye-10.7116, speculations-10.5676, created-10.5461, greek-10.4925, behaves-10.4903, northrop-10.3428, metamorphosis-10.3165, accepted-10.2714, metaphysical-10.0876, whether-10.0198 |

The example further illustrates a set of concept labels corresponding to a collection of documents 122 stored in reference information 120 along with relevance scores determined for the set of concept labels. In one example, the relevance scores for the set of concept labels may be computed as a result of executing step 310 of FIG. 3. The set of concept labels may further be ordered in accordance with their relevance scores (e.g., as a result of executing step 204 of FIG. 2) to generate a first ordered list of concept labels for the text fragment T1 as illustrated below:

| Ordered List of Concept labels and their corresponding relevance scores ||
| --- | --- |
| First Ordered List of Concept labels | Relevance Scores |
| Cosmogony | 0.15388619396361028 |
| Ultimate fate of the universe | 0.12141928327424031 |
| Research university | 0.09409601500462107 |
| Big South Conference | 0.07946370555075907 |
| Edinburgh University Press | 0.07824614004739879 |

In certain embodiments, and as discussed in relation to FIG. 2, the order of the concept labels in the first ordered list of concept labels may be changed based on input received from a user 118 of user device 116. For instance, for purposes of this example, concept labels selection and ordering subsystem 110 may change the first ordered list of concept labels by moving the concept label "Ultimate fate of the universe," to the top of the first ordered list based on the input received from the user and generate a re-ordered list of concept labels as shown below:

| Re-Ordered List of Concept labels based upon user input ||
| --- | --- |
| Re-Ordered List of Concept labels | Relevance Scores |
| Ultimate fate of the universe | 0.12141928327424031 |
| Cosmogony | 0.15388619396361028 |
| Research university | 0.09409601500462107 |
| Big South Conference | 0.07946370555075907 |
| Edinburgh University Press | 0.07824614004739879 |

In certain examples, as discussed in FIG. 2, based on new concept representation vectors generated for the concept labels, the relevance scores for the concept labels are re-computed and a second ordered list of concept labels are identified for the text fragment based on the re-computed (new) relevance scores. In certain examples, the second ordered list may be ordered in descending order with the concept labels with the highest relevance score placed at the top of the second ordered list.

| Second ordered list of concept labels with re-computed (new) relevance scores ||
| --- | --- |
| Second Ordered List of Concept labels | Re-computed Relevance Scores |
| Ultimate fate of the universe | 0.5099698798942952 |
| Cosmogony | 0.44718895634482464 |
| Big South Conference | 0.029660083838299493 |
| Edinburgh University Press | 0.009947334592092034 |
| Research University | 0.003233745330488638 |

In certain instances, the re-computed (new) relevance scores may be normalized prior to outputting the concept labels and their associated relevance scores to the user. The normalization is performed to re-adjust the re-computed relevance scores so that they can be represented on a scale of values ranging from 0-1. It may be observed that as a result of re-computing relevance scores, the re-computed relevance score for the concept label "Big South Conference," and the re-computed relevance score for the concept label "Edinburgh University Press" are now higher than the re-computed relevance score for "Research university." Thus, by re-computing the relevance scores for the set of concept labels determined for the text fragment, the contribution of the concept label, "Research university," has been reduced.

In certain examples, based upon the generated second ordered list, one or more concept labels are selected to be included in a final set of concept labels for the text fragment. In certain examples, from this second ordered list of concept labels, the top three concept labels, namely, "Ultimate fate of the universe," "Cosmogony," and "Big South Conference," may be selected for the text fragment as shown below. The concept labels are then associated with the text fragment and output as being representative of the information contained in the text fragment. In certain embodiments, for each concept label corresponding to the selected concept labels, the re-computed relevance scores associated with those concept labels is also output along with the concept labels as shown below.

| Final set of concept labels with re-computed (new) relevance scores | |
| --- | --- |
| Final Set of Concept labels | Re-computed Relevance Scores |
| Ultimate fate of the universe | 0.5099698798942952 |
| Cosmogony | 0.44718895634482464 |
| Big South Conference | 0.029660083838299493 |

EXAMPLE #2

A second example illustrating an exemplary text fragment, T2, for which concept labels are to be determined is now described.

| Text Fragment - T2 |
| --- |
| There have been many different theories about the origins of the universe, however the most commonly regarded theory is that of the big bang and the expanding universe. In this report I will show evidence to confirm the theory of the big bang. The universe it described as "everything there is all matter and all energy, with an infinite amount of space". The age of the universe is predicted to be around 15 × 10 Hubble's constant is the current expansion rate of the universe and is derived from the speed of recession of stars from a certain distance away. |

A first ordered list of concept labels for the text fragment based on relevance scores computed for the concept labels is shown below. In this example, the concept labels are ordered in accordance with a default order (i.e., a decreasing order) of their corresponding relevance scores to generate the first ordered list of concept labels as illustrated below:

| First Ordered List of Concept labels and their corresponding relevance scores | |
| --- | --- |
| First Ordered List of Concept Labels | Relevance Scores |
| Ultimate fate of the universe | 0.1518127973383566 |
| Cosmogony | 0.1271520502468453 |
| Big Bang (book) | 0.1032342532178822 |
| Research university | 0.08867455376533855 |
| Aristotle's theory of universals | 0.08205311400495276 |

In certain examples, as discussed in FIG. 2, based on new concept representation vectors generated for the concept labels, the relevance scores for the first ordered list of concept labels are then re-computed and a second ordered list of concept labels are generated for the text fragment based on the re-computed relevance scores as shown below:

| Second Ordered List of Concept labels with re-computed relevance scores | |
| --- | --- |
| Second Ordered List of Concept labels | Re-computed Relevance Scores |
| Ultimate fate of the universe | 0.5762376313244817 |
| Big Bang (book) | 0.2548675922975078 |
| Cosmogony | 0.14656443584988582 |
| Aristotle's theory of universals | 0.01769961879374618 |
| Research university | 0.00463072173437859 |

It may be observed that as a result of re-computing relevance scores, the re-computed relevance score for the concept labels "Big Bang Book," and "Aristotle's theory of universals" are higher than their previously computed relevance scores. Thus, as a result of re-computing the relevance scores, the relevance of the concept labels "Big Bang Book," and "Aristotle's theory of universals" has increased and the relevance of the concept label "Cosmogony" has reduced. In certain examples, from this second subset of concept labels, the top three concept labels, namely, "Ultimate fate of the universe," "Big Bang (book)," and "Cosmogony," may be selected for the text fragment. The concept labels are then associated with the text fragment and output as being representative of the information contained in the text fragment. In certain embodiments, for each concept label corresponding to the selected concept labels, the re-computed relevance scores associated with those concept labels is also output along with the concept labels.

The present disclosure addresses several deficiencies of conventional tools by providing an intelligent and improved technique for identifying concept labels for a text fragment where the identified concept labels are distinct, non-overlapping, representative of and semantically relevant to the information contained by the text fragment.

Figure 5:
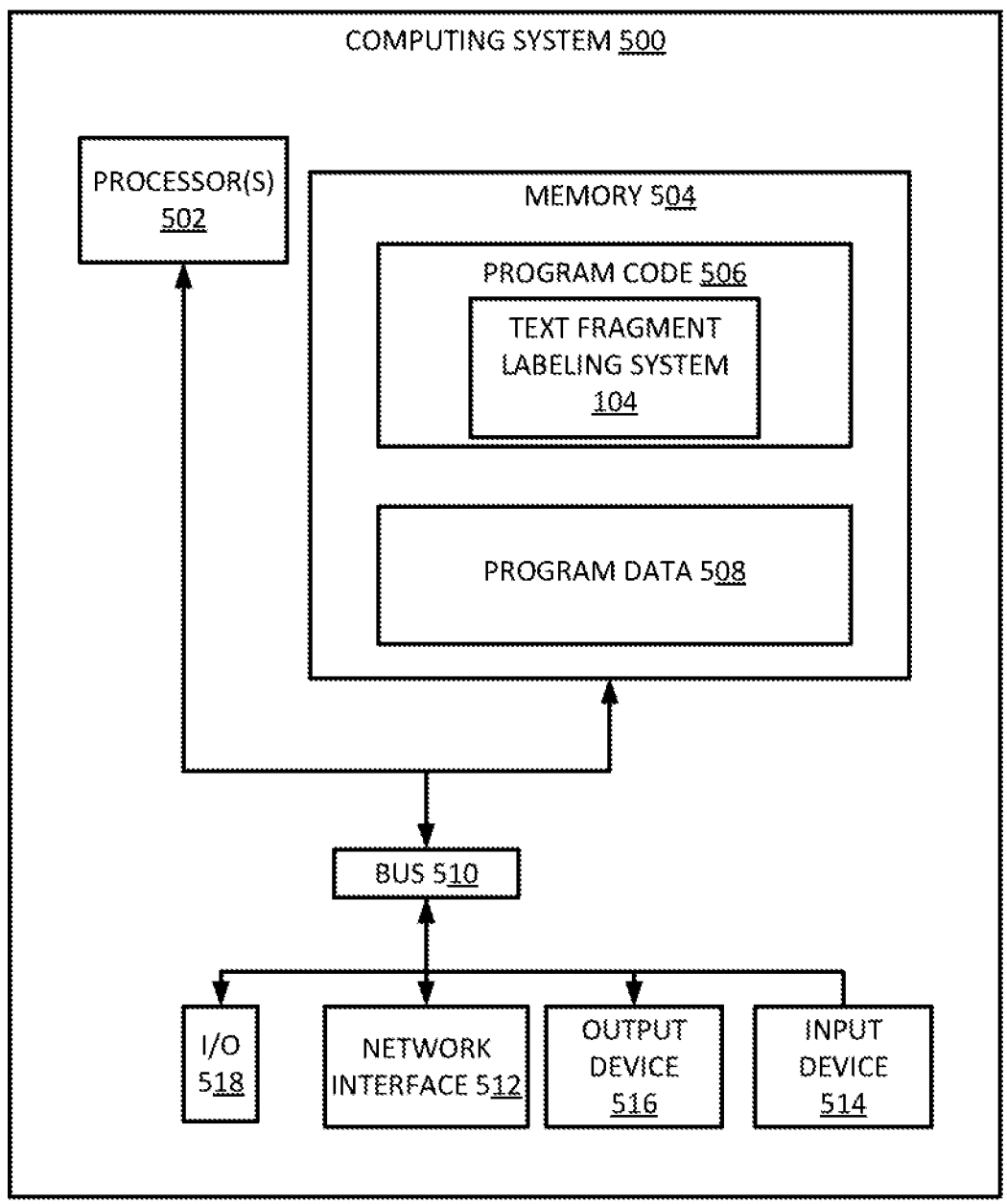
FIG. 5 depicts an example of a computing system for implementing certain embodiments of the present disclosure.

Any suitable computing system or group of computing systems can be used for performing the operations described herein. For example, FIG. 5 depicts an example of a computing system 500. The computing system 500 implements text fragment labeling system 104. In an embodiment, a computing system 500 having devices similar to those depicted in FIG. 5 (e.g., a processor, a memory, etc.) combines the one or more operations and data stores that may be operated as separate subsystems.

The depicted example of the computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing program code 506, program data 508, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 504 can be volatile memory, non-volatile memory, or a combination thereof.

The computing system 500 executes program code 506 that configures the processor 502 to perform one or more of the operations described herein. Examples of the program code 506 include, in various embodiments, text fragment labeling system 104, or any other suitable systems or subsystems that perform one or more operations described herein (e.g., one or more development systems for configuring an interactive user interface). The program code 506 may be resident in the memory device 504 or any suitable computer-readable medium and may be executed by the processor 502 or any other suitable processor.

The processor 502 is an integrated circuit device that can execute the program code 506. The program code 506 can be for executing an operating system, an application system or subsystem (e.g., text fragment labeling system 104), or both. When executed by the processor 502, the instructions cause the processor 502 to perform operations of the program code 506. When being executed by the processor 502, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 504 store the program data 508 that includes one or more datasets described herein. Examples of these datasets include text fragments, concept labels etc. In some embodiments, one or more of data sets, models, and functions are stored in the same memory device (e.g., one of the memory devices 504). In additional or alternative embodiments, one or more of the programs, data sets, models, and functions described herein are stored in different memory devices 504 accessible via a data network. One or more buses 510 are also included in the computing system 500. The buses 510 communicatively couple one or more components of a respective one of the computing system 500.

In some embodiments, the computing system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computing system 500 is able to communicate with one or more other computing devices via a data network using the network interface device 512.

The computing system 500 may also include a number of external or internal devices, an input device 514, a presentation device 516, or other input or output devices. For example, the computing system 500 is shown with one or more input/output ("I/O") interfaces 518. An I/O interface 518 can receive input from input devices or provide output to output devices. An input device 514 can include any device or group of devices suitable for receiving visual, auditory, or other suitable input that controls or affects the operations of the processor 502. Non-limiting examples of the input device 514 include a touchscreen, a mouse, a keyboard, a microphone, a separate mobile computing device, etc. A presentation device 516 can include any device or group of devices suitable for providing visual, auditory, or other suitable sensory output. Non-limiting examples of the presentation device 516 include a touchscreen, a monitor, a speaker, a separate mobile computing device, etc.

Although FIG. 5 depicts the input device 514 and the presentation device 516 as being local to the computing device that executes the text fragment labeling system 104, other implementations are possible. For instance, in some embodiments, one or more of the input device 514 and the presentation device 516 can include a remote client-computing device that communicates with the text fragment labeling system 104 via the network interface device 512 using one or more data networks described herein.

Figure 6:
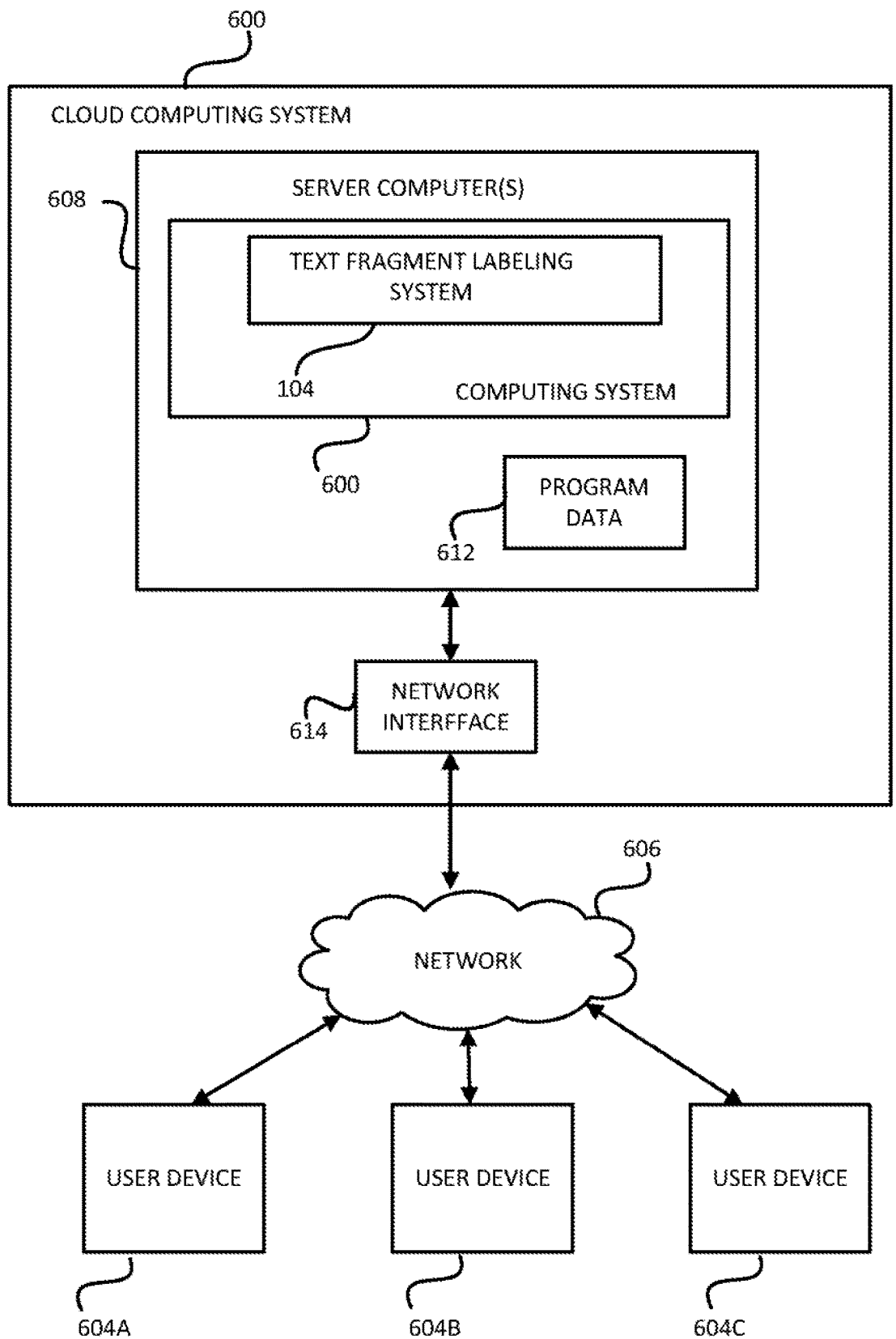
FIG. 6 depicts an example of a cloud computing system offering a text fragment labeling service, in accordance with certain embodiments.

In some embodiments, the functionality provided by the text fragment labeling system 104 may be offered as cloud services by a cloud service provider. For example, FIG. 6 depicts an example of a cloud computing system 600 offering a text fragment labeling service that can be used by a number of user subscribers using user devices 604a, 604b, and 604c across a data network 606. In the example, the text fragment labeling service may be offered under a Software as a Service (SaaS) model. One or more users may subscribe to the text fragment labeling service, and the cloud computing system 600 performs the processing to provide the text fragment labeling service to subscribers. The cloud computing system 600 may include one or more remote server computers 608.

The remote server computers 608 include any suitable non-transitory computer-readable medium for storing program code (e.g., text fragment labeling system 104) and program data 612, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 608 can include volatile memory, non-volatile memory, or a combination thereof.

One or more of the servers 608 execute the program code that configures one or more processors of the server computers 608 to perform one or more of the operations that provide text fragment labeling services, including the ability to identify concept labels and relevance scores for a text fragment provided by one or more subscribers. As depicted in the embodiment in FIG. 6, the one or more servers providing the services to identify concept labels for a text fragment implement text fragment labeling system 104. Any other suitable systems or subsystems that perform one or more operations described herein (e.g., one or more development systems for configuring an interactive user interface) can also be implemented by the cloud computing system 600.

In certain embodiments, the cloud computing system 600 may implement the services by executing program code and/or using program data 612, which may be resident in a memory device of the server computers 608 or any suitable computer-readable medium and may be executed by the processors of the server computers 608 or any other suitable processor.

In some embodiments, the program data 612 includes one or more datasets described herein. Examples of these datasets include concept representation vectors, text fragment vectors, user preferences and so on. In some embodiments, one or more of the data are stored in the same memory device. In additional or alternative embodiments, one or more of the programs, data sets, and functions described herein are stored in different memory devices accessible via the data network 606.

The cloud computing system 600 also includes a network interface device 614 that enable communications to and from cloud computing system 600. In certain embodiments, the network interface device 614 includes any device or group of devices suitable for establishing a wired or wireless data connection to the data networks 606. Non-limiting examples of the network interface device 614 include an Ethernet network adapter, a modem, and/or the like. Text fragment labeling system 104 is able to communicate with the user devices 604a, 604b, and 604c via the data network 606 using the network interface device 614.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   generating, by a computer system, for each concept label in a first ordered list of concept labels determined for a text fragment, a new concept representation vector by removing from a concept representation vector of the concept label contributions of all concept labels in a second ordered list of concept labels;
   computing, by the computer system, for each concept label in the first ordered list of concept labels, a new relevance score for the concept label with respect to the text fragment using the new concept representation vector generated for the concept label;
   re-ordering, by the computer system, the concept labels in the first ordered list based on the new relevance scores computed for the concept labels in the first ordered list;
   including, by the computer system, a concept label placed at top of the re-ordered first ordered list in the second ordered list;
   selecting, by the computer system, one or more concept labels from the second ordered list for inclusion in a final set of concept labels for the text fragment; and
   outputting, by the computer system, information identifying concept labels in the final set of concept labels.

2. The method of claim 1 further comprising performing prior to the generating:
   identifying, by the computer system, from a reference set of concept labels, a first subset of concept labels for the text fragment, each concept label in the first subset of concept labels associated with a relevance score computed for the concept label for the text fragment; and
   ordering, by the computer system, the concept labels in the first subset of concept labels to generate the first ordered list of concept labels, wherein the ordering is performed based at least upon the relevance scores computed for the concept labels.

3. The method of claim 2, wherein the ordering comprises ordering the concept labels in the first subset of concept labels in descending order based upon the relevance scores computed for the concept labels in the first subset of concept labels.

4. The method of claim 3, wherein the ordering comprises:
   ordering the concept labels in the first subset of concept labels in descending order based upon the relevance scores computed for the concept labels in the first subset of concept labels to generate a first ordering; and
   changing, based upon a user input or a user preference, a position of at least one concept label in the first ordering to generate the first ordered list.

5. The method of claim 2, wherein:
   the concept labels in the reference set of concept labels are titles of a plurality of documents; and
   for a concept label in the reference set of concept labels, the concept representation vector for the concept label is a vector representation of contents of a document of which the concept label is a title.

6. The method of claim 5, wherein the plurality of documents are Wikipedia articles and the reference set of concept labels are titles of the Wikipedia articles.

7. The method of claim 5, wherein the concept representation vector for a concept label in the reference set of concept labels is a set of term frequency-inverse document frequency (tf-idf) weights assigned to a set of words occurring in a document associated with the concept label.

8. The method of claim 2, wherein identifying, by the computer system, the first subset of concept labels for the text fragment comprises:

generating, by the computer system, a text fragment vector for the text fragment;

determining, by the computer system, a degree of relevance between each concept representation vector associated with each concept label in the reference set of concept labels and the text fragment vector;

computing, by the computer system, the relevance score for each concept label based on the degree of relevance; and based upon the relevance score computed for each concept label in the reference set of concept labels, identifying, by the computer system, the first subset of concept labels for the text fragment.

9. The method of claim 8, wherein:

the concept representation vectors for the reference set of concept labels are vectors in a multi-dimensional vector space of words; and the text fragment vector for the text fragment is generated for the multi-dimensional vector space of words.

10. The method of claim 1, wherein generating the new concept representation vector for each concept label in the first ordered list of concept labels comprises:

generating an orthonormal vector representation of the concept label in the first ordered list by projecting the concept representation vector of the concept label onto the concept representation vector of concept labels in the second ordered list of concept labels.

11. The method of claim 10, wherein the new concept representation vector for each concept label in the first ordered list of concepts labels is generated using a Gram-Schmidt orthogonalization technique.

12. The method of claim 1, wherein computing the new relevance score for each concept label in the first ordered list of concept labels for the text fragment using the new concept representation vector generated for the concept label comprises:

for each concept label in the first ordered list of concept labels, computing a degree of relevance between a text fragment vector for the text fragment and the new concept representation vector generated for the concept label; and computing the new relevance score for each concept label in the first ordered list of concept labels based on the degree of relevance.

13. The method of claim 1, further comprising repeating the operations of generating, computing, re-ordering, including, and selecting until the first ordered list is empty.

14. The method of claim 1, further comprising repeating the operations of generating, computing, re-ordering, including, and selecting until a threshold number of concept labels are included in the second ordered list.

15. The method of claim 1, wherein selecting one or more concept labels from the second ordered list to be included in a final set of concept labels for the text fragment further comprises re-ordering the concept labels in the second ordered list of concept labels in a descending order of the new relevance scores.

16. The method of claim 1, wherein outputting information associated with the final set of concept labels comprises, for each concept label in the final set of concept labels, outputting information identifying the concept label; and outputting information indicative of the new relevance score computed for the concept label.

17. A system comprising:

a memory storing concept representation vectors associated with a reference set of concept labels; and one or more processors configured to perform processing comprising:

generating, for each concept label in a first ordered list of concept labels determined for a text fragment, a new concept representation vector by removing from a concept representation vector of the concept label contributions of all concept labels in a second ordered list of concept labels;

computing, for each concept label in the first ordered list of concept labels, a new relevance score for the concept label with respect to the text fragment using the new concept representation vector generated for the concept label;

re-ordering the concept labels in the first ordered list based on the new relevance scores computed for the concept labels in the first ordered list;

including a concept label placed at top of the re-ordered first ordered list in the second ordered list;

selecting one or more concept labels from the second ordered list for inclusion in a final set of concept labels for the text fragment; and outputting information identifying concept labels in the final set of concept labels.

18. The system of claim 17, further comprising performing prior to the generating:

identifying, from a reference set of concept labels, a first subset of concept labels for the text fragment, each concept label in the first subset of concept labels associated with a relevance score computed for the concept label for the text fragment; and ordering the concept labels in the first subset of concept labels to generate the first ordered list of concept labels, wherein the ordering is performed based at least upon the relevance scores computed for the concept labels.

19. A non-transitory computer-readable medium having program code that is stored thereon, the program code executable by one or more processing devices for performing operations comprising:

generating, for each concept label in a first ordered list of concept labels determined for a text fragment, a new concept representation vector by removing from a concept representation vector of the concept label contributions of all concept labels in a second ordered list of concept labels;

computing, for each concept label in the first ordered list of concept labels, a new relevance score for the concept label with respect to the text fragment using the new concept representation vector generated for the concept label;

re-ordering the concept labels in the first ordered list based on the new relevance scores computed for the concept labels in the first ordered list;

including a concept label placed at top of the re-ordered first ordered list in the second ordered list;

selecting one or more concept labels from the second ordered list for inclusion in a final set of concept labels for the text fragment; and outputting information identifying concept labels in the final set of concept labels.

20. The non-transitory computer-readable medium of claim 19, wherein generating the new concept representation vector for each concept label in the first ordered list of concept labels comprises:
generating an orthonormal vector representation of the concept label in the first ordered list by projecting the concept representation vector of the concept label onto the concept representation vector of concept labels in the second ordered list of concept labels.

* * * * *